United States Patent [19]

Chick et al.

[11] 4,149,199

[45] Apr. 10, 1979

[54] MAGNETIC DISC STORAGE DEVICE WITH TRACK CENTERING CORRECTION

[75] Inventors: David M. Chick, Aldershot; Kenneth H. Sinden, Staines, both of England

[73] Assignee: Data Recording Instrument Company Ltd., Staines, England

[21] Appl. No.: 813,416

[22] Filed: Jul. 6, 1977

[30] Foreign Application Priority Data

Jul. 6, 1976 [GB] United Kingdom ............... 27973/76

[51] Int. Cl.² .......................................... G11B 21/10
[52] U.S. Cl. .................................................. 360/77
[58] Field of Search ........................................ 360/77

[56] References Cited

U.S. PATENT DOCUMENTS 3,821,804  6/1974  Stevenson et al. ..................... 360/77

Primary Examiner—Robert S. Tupper
Attorney, Agent, or Firm—Hane, Roberts, Spiecens & Cohen

[57] ABSTRACT

In a magnetic disc data storage device using exchangeable magnetic discs for recording data signals, a track containing reference signals is provided and a read-write head is moved to the reference track and as the disc rotates, the position of the head relative to the axis of rotation of the head is sampled. Any errors in the position of the reference signals due to eccentricity of the track are stored and are used during subsequent accesses of data tracks on the disc to modify the head position so as to ensure that the head follows a track having a predetermined spatial relationship with the reference track.

5 Claims, 9 Drawing Figures

MAGNETIC DISC STORAGE DEVICE WITH TRACK CENTERING CORRECTION

BACKGROUND OF THE INVENTION

This invention relates to magnetic-disc data storage devices having movable read-write heads.

In such devices data is arranged on the discs in tracks, and a single head is movable to access a number of tracks. During a transfer the head is positioned over a track and should be aligned with it accurately. This ensures, if the head is reproducing, that it receives a signal of the maximum strength free from interference from neighbouring tracks, and, if the head is recording, that the neighbouring tracks are not overwritten and the data is positioned in the expected place for a subsequent read operation. The more accurately the head can be positioned, the closer the tracks can be packed to one another on the disc.

When the storage device uses multi-disc packs with a head for each surface and the different heads coupled together it has been proposed to devote one surface to servo tracks which the head for that surface can be caused to follow. The remaining heads can thus be brought to reproducible positions on the discs. But this arrangement is wasteful of space that could be used to carry useful data, and is impractical for disc packs with only a few data surfaces.

An alternative is to position the head by reference to a separate position transducing system mounted in the device itself.

The head will then be fixed relative to the body of the storage device. However, if the track is not an accurate circle centred on the axis of rotation of the disc its radial position may vary, and the track will not remain accurately beneath the head. Such variations may occur if the disc is exchangeable and has been recorded on a different drive unit. The track, though circular, may then be off-centre when mounted on a unit other than the one which it was recorded. A similar eccentricity may occur even on the unit on which the disc was recorded if it has been taken off and replaced in a different angular position.

SUMMARY OF THE INVENTION

This invention provides a method of data transfer between a magnetic disc and a magnetic disc data storage device having a movable read-write head comprises measuring the position, relative to the axis of rotation of the disc in the storage device, of at least three non-collinear reference positions on the disc and in subsequent accesses of data tracks on the disc controlling, as the disc rotates, the position of the head in such a manner that the head is maintained in a substantially constant relationship with a locus on which the reference positions lie so as to enable the transfer of data to and from a track having said selected relationship with said locus.

This locus on which the reference positions lie thus serves as a standard to control the position of the head. The head will follow tracks which bear a fixed relation to it, and are thus fixed relative to the disc, even if the locus is not centred on the axis of rotation. If the disc is removed and remounted on the same drive unit, or mounted on a different drive unit using the same locus as its standard, the head will be constrained to follow these same tracks even if the axis of rotation of the disc has been displaced.

Preferably the reference positions are magnetically recorded on the disc and, as part of the step of measuring their positions, the head is moved to a position where it can pick up signals from them.

There may then be recorded information the position of which defines the position of the locus, the reference positions being obtained by measuring positions on the locus in response to timing signals.

If there are only three reference positions they will be on a common circle, and the measurement of their position relative to the axis of rotation will allow the centre and radius of this circle to be determined and to form the locus. But preferably there are more than three, the displacement of the reference positions from a zero position fixed relative to the axis of rotation is measured, and in controlling the head the said displacements are added, as the disc rotates, to a nominal position relative to the axis for the head. Thus no additional calculation steps are needed to determine the corrections to be applied. The greater the number of reference positions, the greater the accuracy that will be achieved.

Preferably the step of measuring the position of the reference position is repeated as part of a check cycle in which it is preceded by moving the head to the area bearing the reference information, the check cycle being arranged to take place repeatedly during interruptions in the transfer of data, the measurements of each check cycle being used in controlling the head is subsequent track accesses until the next check cycle. Such a method is the subject of our copending U.S. patent application Ser. No. 813,330, and may be as described in it. It compensates for temperature changes, which would alter the relationship between the disc and the position-measuring means.

The information defining the reference positions may be recorded on the disc by a method which comprises mounting the disc in the device, moving the head to a predetermined area, testing if the information is recorded in that area, and, if it is not, recording the information.

The invention also provides a magnetic-disc storage device suitable for carrying out the method of the invention.

BRIEF DESCRIPTION OF THE DRAWINGS

Two forms of magnetic-disc storage device in accordance with the invention will now be described in greater detail by way of example with reference to the accompanying drawings, in which.

DESCRIPTION OF THE PREFERRED EMBODIMENTS

Figure 1:
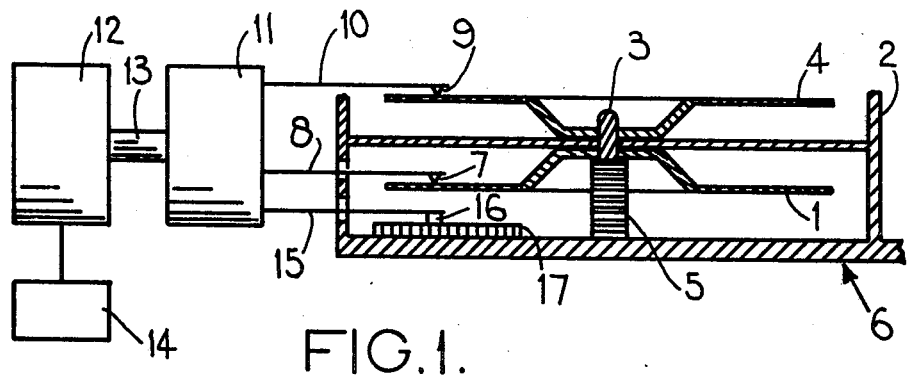
FIG. 1 is a diagrammatic view, partly in section, of both forms of storage device.

Referring to FIG. 1, the two forms of magnetic disc storage device that will be described have a similar structure for mounting the discs and read-write heads but differ in the means for controlling the head. The parts they have in common will be described first.

A fixed disc 1 is permanently mounted in the storage device beneath a casing 2. The fixed disc 1 is mounted on a spindle 3 which projects from the casing 2 and on which can be mounted an exchangeable disc 4. The spindle 3 is driven from a motor 5 mounted in the body of the storage device (shown partially at 6).

A read-write head 7 carried on an arm 8 cooperates with the fixed disc 1, and a read-write head 9 carried on an arm 10 cooperates with the exchangeable disc 4. Both arms project from a carriage 11 which is mounted on a rail (not shown) so that it can move towards and away from the centre of the discs. The carriage 11 is moved by a motor 12, for example a voice-coil motor, to an extension 13 of whose armature it is connected. The motor 12 is supplied from a servo amplifier 14.

A further arm 15 projects from the carriage 11 and carries at its end a sensor 16 which, with a scale 17 mounted on the body of the storage device, forms a position transducer. The scale 17 carries a series of parallel conductors joined at alternate ends to form a single winding; the sensor 16 carries a short section of a similar winding. A high-frequency current is passed through one, and the voltage induced in the other observed.

Nulls occur whenever the crosspieces of one are half way between those of the other and are counted as a primary indication of the position of the heads 7 and 9. Between the nulls the magnitude of the voltage provides an indication of the separation from the null position. The position transducer thus provides a direct indication of the position of the sensor 16 with respect to the scale 17, and an indirect indication of the position of the heads 7 and 9 with respect to the scale 17.

The indicated position of the heads 7 and 9 is used as one input to the servo system to control the positioning of the heads 7 and 9 during a data transfer. However, if it were the sole input the head would not be aligned with the track if the data area on the disc did not bear the expected relationship with the scale 17 or if the head was not correctly aligned with the sensor. Such misalignments can occur if there are temperature differences between the various parts, which will cause them to expand by different amounts.

The problem is less serious for the fixed than the exchangeable disc. The fixed disc is maintained in the same environment as the sensor, and careful matching of materials and mounting of the parts can ensure that they expand equally. But the exchangeable disc will often be at a different temperature from the storage device when it is first mounted on the device. Usually it will be cold while the device is warm, but it may be the other way round if the device is being started from rest. During the period while temperature equilibrium is being reached the temperature differences will be changing and the alignment of the head with the disc will vary. As will be explained, a correction is introduced into the positioning system as a compensation for these differences.

Figure 2:
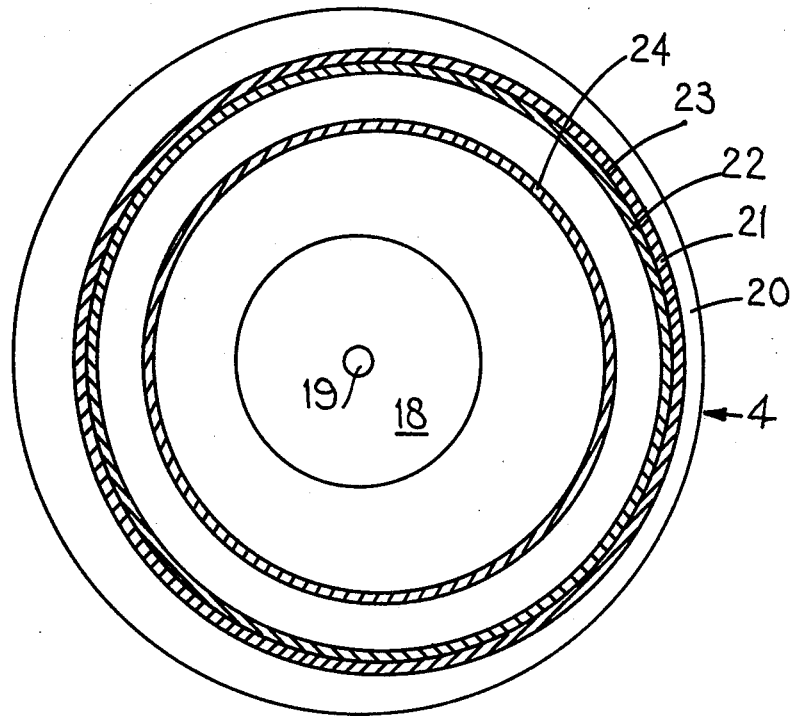
FIG. 2 is a diagrammatic view of an exchangeable disc suitable for use with the two forms of storage device.

Referring to FIG. 2, the exchangeable disc 4 has a hub 18 with a central opening 19 to fit over the spindle 3. It also has a magnetic surface 20 which, for an exchangeable disc to be used with this storage device, carries a reference track 21, and, immediately inside the track 21, a reference track 22. The boundary 23 between them forms a reference locus. The data tracks (of which an example 24 is shown) are situated inside the reference tracks 21 and 22.

Figure 9:
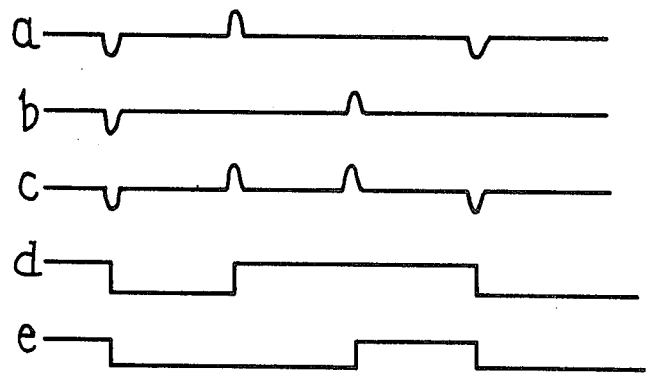
FIG. 9 shows waveforms occurring in the initialisation procedure.

If the head 9 is in the neighbourhood of the reference tracks 21 and 22 it picks up signals from them which allow its position relative to them to be derived. The two tracks are recorded with signals using the "tri-bit" system, as described for example, in IBM Journal of Research and Development, November 1974, page 506. Accurately aligned synchronizing pulses of the same sense are obtained from the two tracks 21 and 22 and are followed by two pulses in the opposite sense, one in each track, which occur at different times. (These waveforms are shown in FIG. 9 as waveforms a and b.)

Timing controls initiated by the synchronising pulses demodulate the output from the head into two channels, each containing the pulse from one track. The earlier is delayed to coincide with the later and one is subtracted from the other to give a signal indicative of the position of the head relative to the centre-line between the tracks (the locus 23). For example, if the head is equally over both tracks the pulses picked up by the head from the two tracks will be of equal strength and the final signal will be zero.

The position signal can form an input to the positioning servo system so that the head 9 is caused to follow the locus 23 between them in the known manner.

The two tracks 21 and 22 are recorded with aligned index marks which define a zero position on the circumference of the disc as it rotates.

The tracks 21 and 22 are not necessarily centred on the spindle 3. The manner in which they may be recorded on the disc will be described subsequently.

Figure 3:
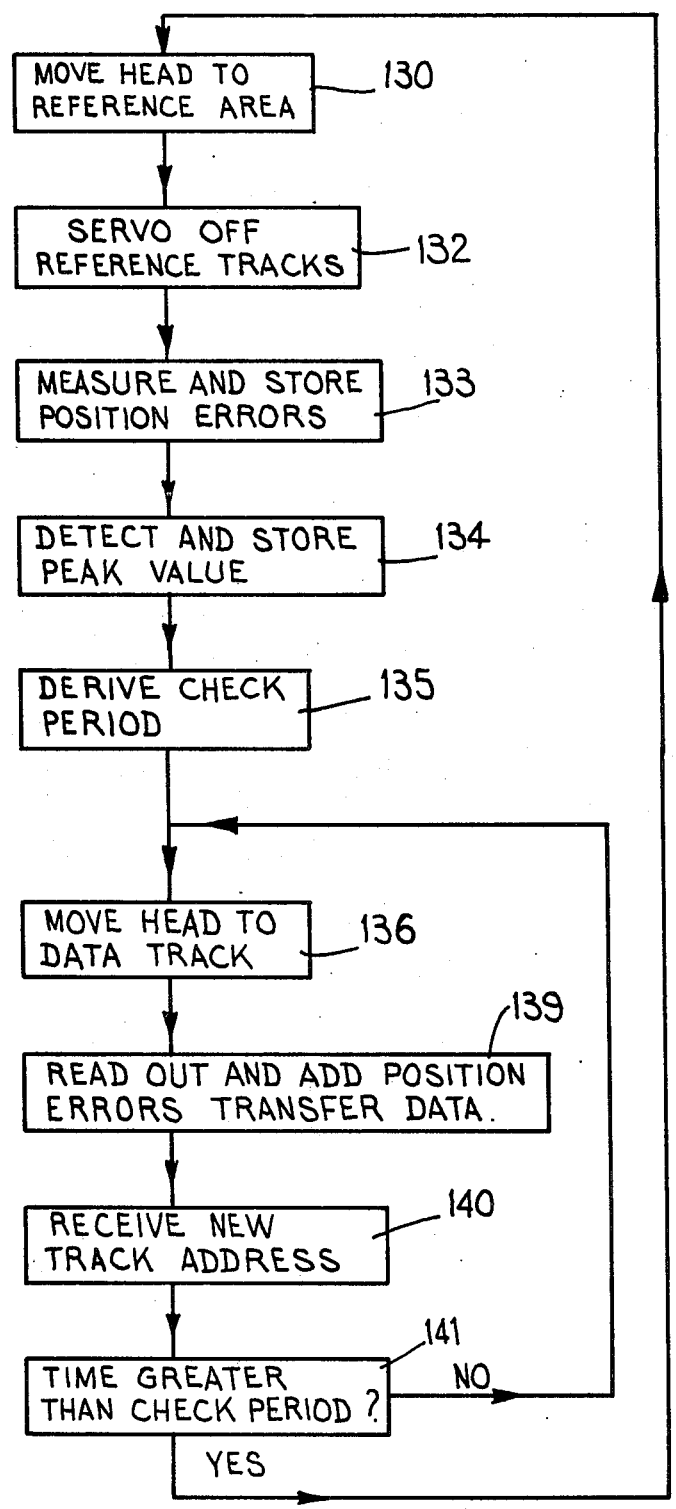
FIG. 3 is a flow-chart showing the method of data transfer used by both forms.
Figure 4:
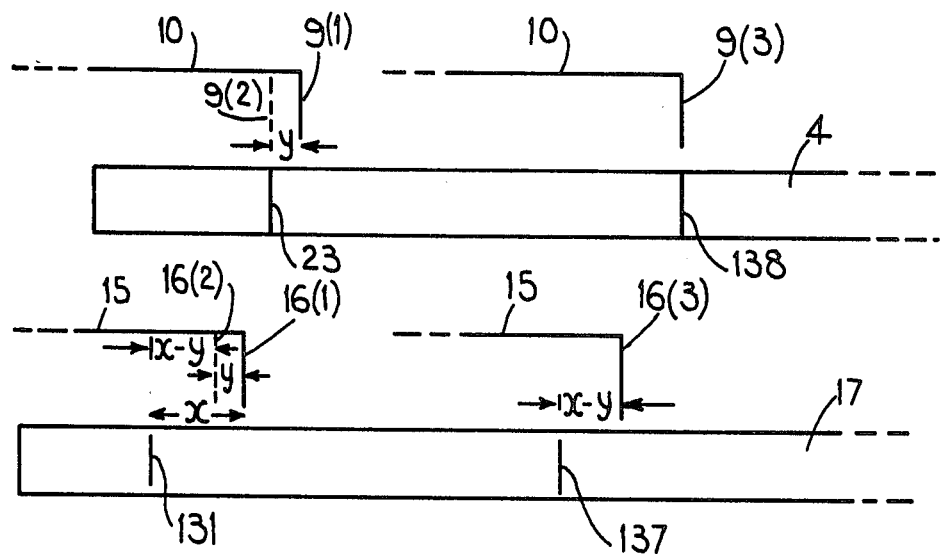
FIG. 4 is a diagram showing positional relationships between the exchangeable disc and the position-transducing scale in the two forms.

The method of transducer positioning used by both forms of apparatus will now be described with reference to FIGS. 3 and 4. FIG. 3 is a flow-chart of the method. FIG. 4 is a diagram showing the positional relationships between the exchangeable disc 4 and its head 9 and the scale 17 and sensor 16. It is not to scale and the various items are represented by their centre lines.

Periodically during the course of its operation the device carries out a check cycle between accesses of tracks on the exchangeable disc. Assume that a new track address has been received in the conventional manner from the device controller and that one of these check cycles is due to take place. The head 9 is moved (block 130 of FIG. 3) by the positioning servo, which is responding to the output of the position transducer, until the sensor 16 reaches a zero position 131 on the scale 17. This is the position at which, if the device and disc were both at their nominal operating temperature, the head 9 would be correctly over the reference locus 23. However, for the reasons explained, the head 9 may not be over the locus 23, although it will be in the reference area in which it can pick up signals from the tracks 21 and 22. The control of the head is therefore switched to servo from the locus 23 (block 132). The head will move to a position 9(1), which is shown displaced by an amount y from the locus 23 to represent the positional error required to operate the servo system.

At this point the sensor 16 is at a position 16(1), displaced by a distance x from the zero position 131. If the head 9 has been at the position 9(2), directly over the reference locus 23, the sensor 16 would have been at a position 16(2), displaced by a distance x − y from the zero position. This is the amount by which the indication of position produced by the position transducer is in error in representing the position of the head 9 with respect to the disc 4.

The error x − y is measured at a number of positions as the disc rotates and the values stored (block 133). Thus a record is kept which shows the radial position of the reference locus even if it is not a circle centred on the axis of rotation.

The peak of these errors is detected and its value stored (block 134). This peak is compared with the peak of the previous cycle and a duration is derived from their difference (block 135). This duration is that of a check period which determines when the next check cycle can take place. It is arranged to be smaller the greater the difference between the values from successive periods. That is, when a disc is first mounted and the position of the reference locus 23 is changing rapidly, the checks will be carried out more frequently.

The check cycle is now complete and the head 9 moves to access the data track whose address was received immediately before the check period (block 136). But instead of being brought to rest over the nominal scale position 137 that corresponds to the data track, the stored errors are read out as the disc rotates and are added as an offset so that the positioning system aims to position the sensor 16 at 16(3), displaced by x − y from the nominal position 137 (block 139). The head 9 is then over a position 138 on the disc.

This position is displaced from the reference locus 23 by an amount equal to the separation between the scale positions 131 and 137. The head is thus positioned a reproducable distance from the locus 23, and this relationship will be maintained even if the disc expands so the the locus 23 shifts, or if the arms 10 and 15 expand by different amounts so that the head 9 is no longer aligned with the sensor 16, which would also introduce an error. The relationship will also be maintained if the disc is mounted on a different unit (or remounted on the original unit but in a different angular position) when owing to variations in the mounting arrangements the axis of rotation of the disc may shift slightly.

As an example, eight is in many cases a suitable number for the error sampling points as the disc rotates. But the number chosen depends on the accuracy of compensation required and may, for instance, be increased for greater accuracy.

As the disc rotates the data is read from or written to the track in the normal way (block 139). After the transfer has been completed instructions from the storage device controller will be received indicating a new track address (block 140). If the time that has elaspsed since the check cycle is less than the check period (block 141) the head moves to this track address and corrects the head position using the stored position errors. It continues to use these errors in accessing tracks until the elapsed time exceeds the check period — that is, it cycles through the steps of blocks 136 to 141.

When a new track is requested and the elapsed time is greater than the check period (block 141), the device again carries out a check cycle, carrying out the steps of blocks 130 to 135. It then uses the new position errors until the next check cycle.

Figure 5:
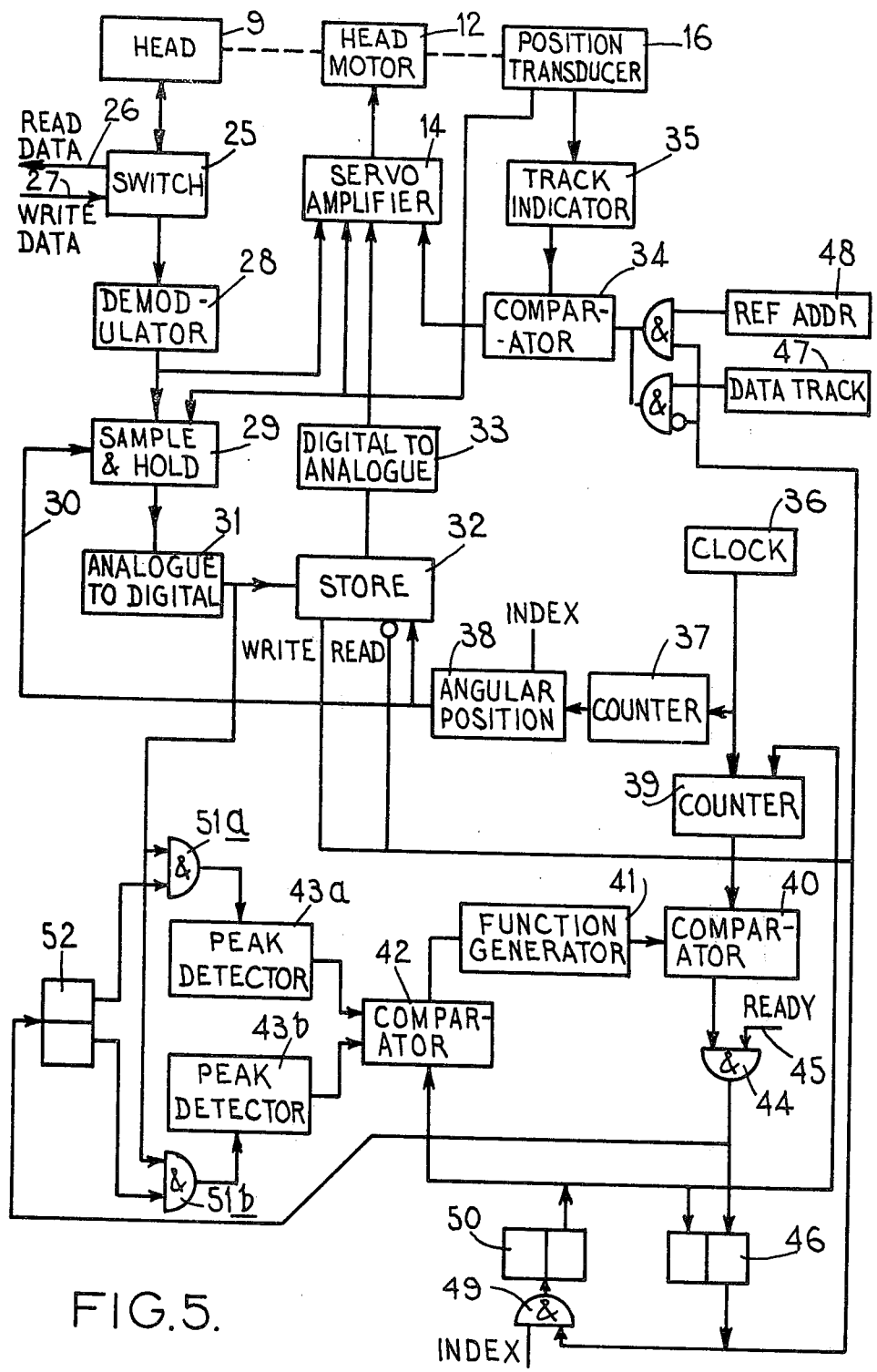
FIG. 5 is a block diagram of part of the first form.

Referring to FIG. 5, the apparatus for controlling the head of the exchangeable disc in the first form of apparatus will now be described.

The head 9 is connected to a switch 25 which during a data transfer passes on the data read by the head on a line 26 or receives write data for it on a line 27. During a check cycle the switch 25 passes the output of the head to a demodulator 28 which produces a signal indicative of the position error x of the head in the manner explained. This signal is supplied to the servo amplifier 14 so that the head can servo off the locus 23 in the known manner. It is also supplied to the negative input of a sample-and-hold circuit (a commercially available unit) 29, the positive input of which is supplied by the output y of the position transducing sensor 16 (assuming it is the sensor that produces the output rather than the scale, which is also possible). The signal from the position transducer 16 is also supplied to the servo amplifier 14 so that it can provide a fine control for the positioning system.

The sample-and-hold circuit is clocked on a line 30 and at each clock pulse retains the current value of the difference between its inputs, that is the value x − y. Distances must of course be measured in a consistent direction, so that if the head 9 comes to rest on the left of the locus 23 in FIG. 4, the value of y is indicated by a negative signal, the magnitude of which after subtraction by the input of the sample-and-hold circuit 29 is added to x.

The value x − y held by the sampe-and-hold circuit 29 is converted to binary form by an analogue-to-digital converter 31 and written to a random-access store 32. The values when read out of the store 32 are supplied via a digital-to-analogue converter 33 to the servo-amplifier 14.

The servo-amplifier 14 also receives the output of a comparator 34 which compares the desired address with the current track address held in a track indicator 35, which counts the nulls from the position transducer 16. While the two addresses are different the comparator 34 issues a signal of the right sense to cause the servo-system to move the head in the required direction.

Clock pulses are produced by a crystal oscillator 36. They are divided by a counter 37, which advances a counter 38 when it reaches its maximum. The counter 38 is reset each time the index of the disc track is detected and thus holds an indication of the angular position of the disc. It controls the operation of the sample-and-hold circuit 29 via the line 30 and supplies the address signals for both storing and reading out the position errors. The locus 23 is therefore sampled at points determined by this counter.

The clock pulses are counted by a further counter 39 which is reset at the end of each check cycle and thus holds an indication of the elapsed time since a check cycle. The value of the counter is compared by a comparator 40 with the output of a function generator 41. The input to the function generator 41 is supplied by a comparator 42 which compares the values held in two peak detectors 43a and 43b, one of which holds the value from the current check cycle and the other the value from the previous check cycle.

The function generator 41 (preceded and followed by converters to and from analogue, not shown) converts the difference between the peak errors into values which can be compared with the elapsed time to give the desired relationship between the check period and the difference between peaks.

When the comparator 40 produces an output it indicates that enough time has elapsed for a check cycle to be allowed to take place. Its output goes to an AND gate 44 which also receives, on a line 45, the Ready signal which indicates that the device controller wishes to initiate a new track access. An output from the gate 44 thus indicates that both conditions for a check cycle are met. It sets a bistable 46 the output from which indicates that a check cycle is in progress. This output inhibits the desired track address supplied by the controller and held in a register 47 from being supplied to the comparator 34, and enables the supply of the address of the reference locus, which is held permanently in a register 48. The servo-system responds by moving the head to that address.

The switch 25 is operated by the first index signal detected by the head in the output of the reference tracks 21 and 22. It passes the signal from the reference tracks to the demodulator 28, from whence it is supplied to the servo-amplifier 14 so that it servos off the reference locus 23, the fine-position control signal from the position transducer 16 being disabled for the duration of check cycle by the output of the bistable 46. This output also enables the store 32 for writing, so that the position errors are written to the addresses supplied by the counter 38.

The output of the bistable 46 enables the index pulses to be passed via an AND-gate 49 to a toggle 50 which produces an output on the second index pulse detected after the start of the check cycle. This indicates that a complete revolution has taken place during which the errors have been measured and acts as a signal that the check cycle is over. It returns the switch 25 to passing read or write data and disconnects the supply of the servo-off-track error signal to the amplifier 14. It also resets the bistable 46, which has the effect of disabling the supply of the reference-locus address from the register 48 and enabling that of the data-track address from the register 47. The head then moves to this position.

The absence of an output from the bistable 46 also enables the store 32 for reading. The addresses from the counter 38 cause the appropriate errors to be read out and supplied to the servo-amplifier 14 where they balance the output of the position transducer 16. The head is thus controlled to adopt a position displaced by x − y from the position at which it would otherwise come to rest. The sign of the signal output from the converter 33 is reversed from that originally recorded so that the error signal produced by the transducer is of the same sense as that originally recorded. This ensures that the head will be, in the example of FIG. 4, to the right of the scale position, as it should be.

The signal from the toggle 50 indicating the end of the check cycle initiates the comparision by the comparator 42, of the peak values held in the peak detectors 43a and 43b. During the check cycle one only of these detectors is enabled by a gate 51a or 51b to receive the output of the analogue-to-digital converter 31. The gates 51a and 51b are enabled alternately by a toggle 52 which is triggered by the signal from the gate 44 indicating the start of a check cycle. Thus while one peak detector 43 is receiving the current values the other holds the value from the preceding period. During the check cycle the operative detector 43 compares each incoming value with the value it holds and retains the greater. Thus at the end of the cycle it holds the peak value.

The signal from the bistable 50 indicating the end of the check period resets the counter 39 to restart the count of elapsed time which will control the start of the next check cycle.

Figure 6:
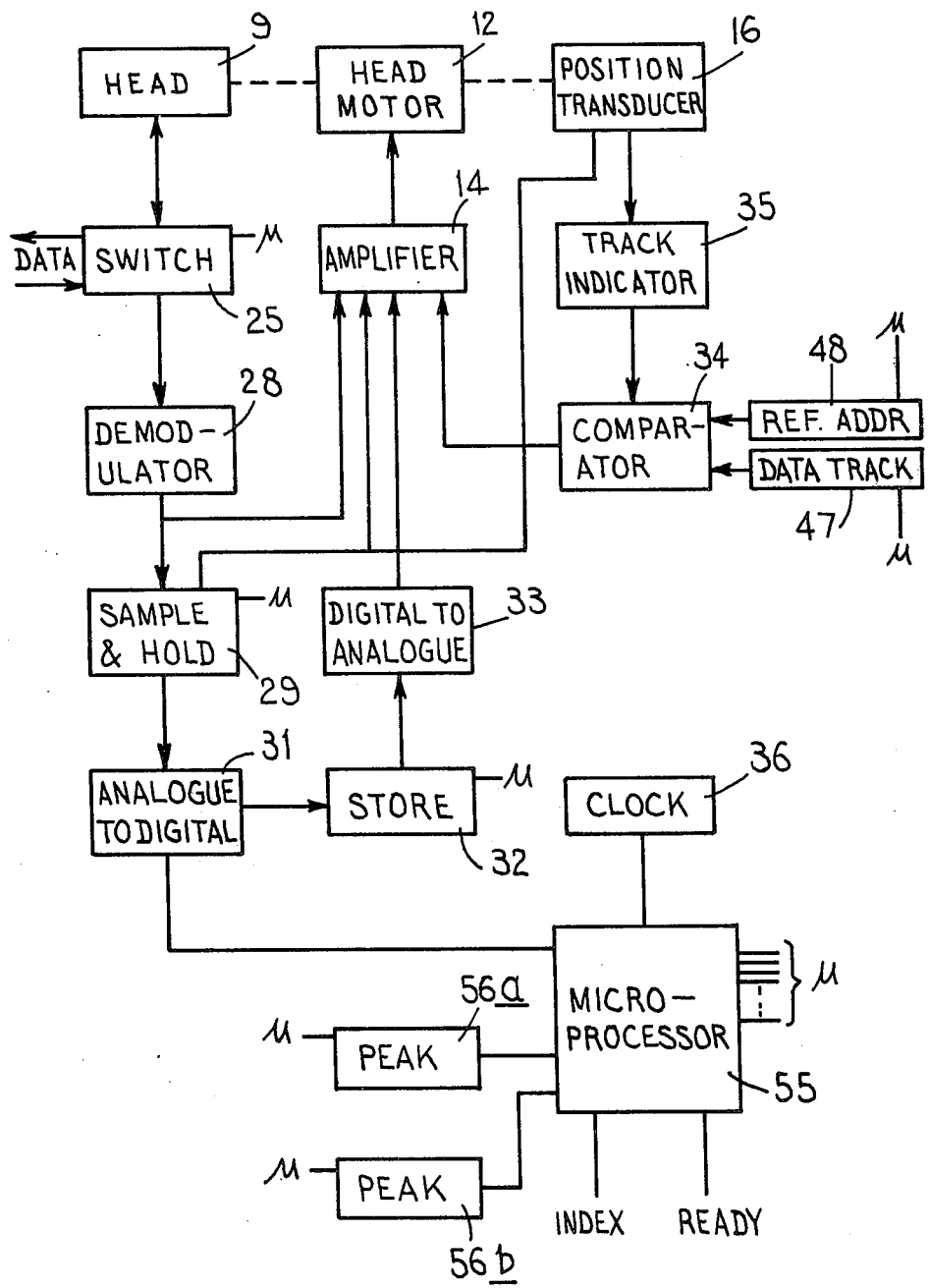
FIG. 6 is a block diagram of part of the second form.

Referring to FIG. 6, the second form of storage device uses a generally similar method to control the head, except that the control signals are provided by a microprocessor 55 rather than by logic elements. Elements that correspond to those of the first form are given the same reference numerals.

The microprocessor 55 receives the clock pulses from the clock 36 and system signals such as the index and Ready signals. It issues control signals (shown diagrammatically, and labelled u in the figure) which control the transfer of data between the elements in the same sequences as in the first form and so that it carries out the method as described with reference to FIG. 3.

The microprocessor 55 counts the clock pulses to provide an elapsed time indication similar to that from the counter 39 and an angular position indication similar to that from the counter 38. The angular position indications address the store 32 and control the sample-and-hold circuit 29 as in the first form.

The error values are supplied to the microprocessor, which determines the current peak, storing it alternately in a register 56a or 56b. It compares the two and processes them in accordance with a stored algorithm to produce the check period, which it compares with the elapsed time it counts.

Suitable microprocessors are commercially available. The actual programming of the microprocessor is by well-known techniques which do not form part of this invention.

Various changes may be made to the storage devices described.

The reference locus may be placed elsewhere, for instance in the middle of the data tracks. The reference tracks may be encoded by other methods, for instance they may be frequency encoded, or peak detection methods may be used. Values shown held in registers, like the registers 47, 48 and 56a and b may be held in locations in the store 32.

As an alternative to using inductive methods the position transducer may use optical or magnetic methods.

During the check cycle the value y of the servo-off-track error may be ignored if a lower standard of compensation is acceptable.

Instead of the described method in which during the check cycle the head servos off the reference locus, the head may be positioned by the position-transducing system with the sensor at the expected position 131 for the locus on the scale 17. The position error is then derived from the error indicated by the servo-off-track system.

If the exchangeable disc is one of a pack (or uses both surfaces of the disc to hold data) there may be reference tracks on only one surface, all the heads being coupled. Alternatively each may have its own reference tracks and may use them as described herein. This relaxes the need to align the heads. The fixed disc may also use the described method, in which case the requirements on materials and positioning to equalise expansion may be relaxed. As the fixed disc does not need to be remounted on a different unit the data tracks are not likely to be eccentric, and hence only one position check need be made during the check period. The resulting value is then used throughout the data transfer.

The error signal may be read out of the store in advance of the time in the revolution at which it was recorded. This can be arranged to compensate for the delay in the response of the positioner motor to its input. An advance of half the sampling period also gives a better approximation by averaging the departure between the discrete errors read out and the actual continuously varying error.

In the described examples the head is positioned a distance from the reference locus equal to the distance between the scale positions 131 and 137. Thus differences between the amounts this distance and the corresponding distance on the disc expand are not compensated for. But since the data area occupies only quite a small fraction of the radius of the disc this effect is small in comparison with expansion of the disc as a whole and the movement of the average position of the scale. If desired, however, greater accuracy of compensation may be achieved by scaling the errors when they are read out in accordance with the radial position of the particular data track. Alternatively, the check cycle may include the checking of two reference loci, one inside and one outside the data area, in the same manner as has been described up to now for one locus. The values for the data tracks are then interpolated.

The store and its converters from and to analogue can be replaced by a delay line holding a complete revolution's worth of position error. As an example the delay line could be a charge-coupled device.

Each check cycle takes place when the device controller provides a new track address. This is an interruption in the flow of data being transferred to or from the disc that would occur in any case, even if the check cycle did not take place. The controller need not be aware that check cycles take place, and the percentage of time spent on them can be made sufficiently small not significantly to affect the operation of the device.

Using the result of the check cycle the head is positioned at a distance from the reference locus, that is substantially fixed for each track. Hence, compensation is provided for variations in the position of the locus, such for example as occur when the temperature of the disc changes. And this relationship with the reference locus is maintained even if the data track becomes eccentric with respect to the axis of rotation, as may occur if the disc is removed and remounted.

The method of initialising the exchangeable disc will now be described. When an exchangeable disc is first placed in the storage device, the device carries out a check to discover if the reference tracks are present and, if not, writes them on the disc. The positioning of the head during this step is provided by servo tracks on the fixed disc encoded as described before. For explanation it will be assumed that these tracks are at positions −1, −2 and −3 in the track-numbering system used for the data tracks.

Figure 7:
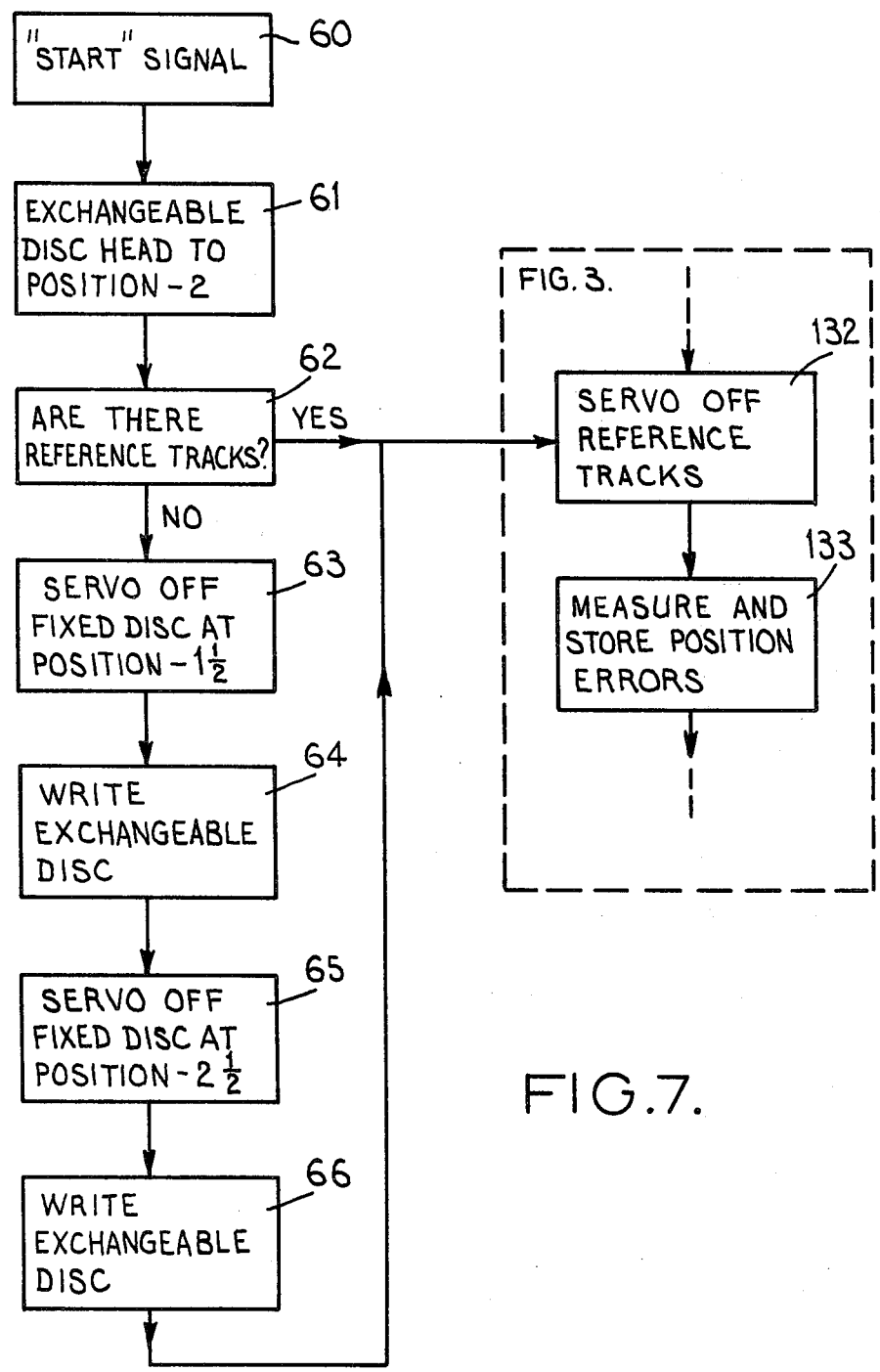
FIG. 7 is a flow-chart of the initialisation method used by both forms.

Referring to FIG. 7, assume that the exchangeable disc has just been mounted and the start signal given (block 60). The head then moves, under the control of the servo-system, to the transducer position corresponding to track −2 (this is the position of the reference locus if the reference tracks have been recorded) (block 61). It then reads the disc (block 62) and tests for the presence of the clock signals of the reference track (block 62).

If they are present it proceeds to servo off the reference tracks and measure the position error in the manner previously described (blocks 132 and 133 of FIG. 3) and then to continue as before. If not, it switches to servoing off fixed-disc tracks −1 and −2, following their boundary in the known manner (block 63). With the heads thus controlled it writes a reference track on the exchangeable disc at position −1½, deriving the write signal from the signal read from the fixed disc (block 64). It then servos off fixed-disc tracks −2 and −3 (block 65) and writes exchangeable-disc track −2½ (block 66). Finally it switches to servoing off the exchangeable disc at track −2, and continues on as before from block 132 of FIG. 3.

Thus if the exchangeable disc is already recorded with reference tracks the device will use them. If there are no reference tracks the device will record them so that they can be used as a reference for that disc in future.

Figure 8:
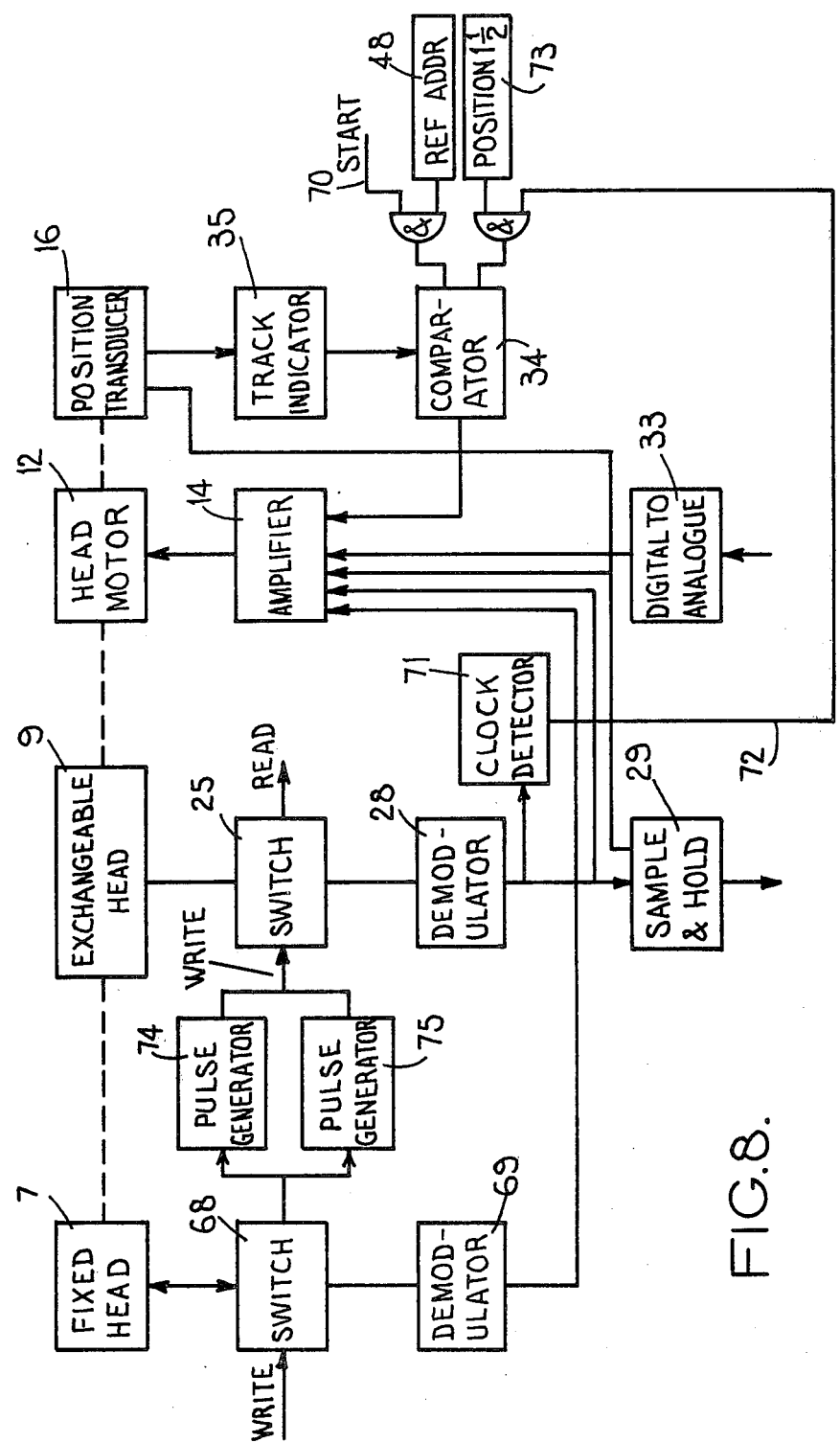
FIG. 8 is a block diagram of the part of device for controlling the initialisation procedure.

Referring to FIG. 8, the way the extra elements to carry out the initialisation procedure are introduced into the apparatus will now be described.

The fixed-disc head 7 has a similar switch 68 and demodulator circuit 69 to the switch 25 and demodulator circuit 28 of the exchangeable-disc head. The output of the fixed-disc demodulator circuit 69 supplies its output to the positioner amplifier 14 as an error signal to allow servo-following of the fixed-disc reference tracks in the normal way.

After an exchangeable disc has been mounted in the device a Start signal on a line 70 indicates that the apparatus is in a condition to transfer data. This signal gates the address of the reference locus (track −2 using the number given above as an example) to the comparator 34 and the heads move to this position. A circuit 71 detects the clock pulses if they are present in the output of the exchangeable-disc head 9 and allows the apparatus to proceed as before if they are. If there are no clock pulses it issues a signal on a line 72 which gates the contents of a register 73 holding the address −1½ of the boundary between the first pair of fixed-disc reference tracks to the comparator 34 and switches the output from the fixed-disc head 7 so that the error signal from the demodulator 69 is supplied to the positioner amplifier 14. The heads thus follow the fixed-disc track boundary. At the same time the signal read from the fixed-disc head 7 is supplied to a pulse generator 74 which produces a write signal for the exchangeable-disc head 9.

After a complete track has been written the address (−2½) of the other boundary of fixed-disc reference tracks is gated to the comparator from a register (not shown). The heads move to that position and follow the boundary, the servo error signal continuing to be supplied to the amplifier 14. During this revolution a second pulse generator 75 supplies a write signal for the head 9 and the reference track is written on the exchangeable disc.

Referring to FIG. 9, the signal from one of the reference tracks is as shown at a. The negative-going pulse is the clock pulse. The signal from a neighbouring track is as shown at b. The actual signal from the head superimposes them as at c. (To produce the servo input there will be a slight difference between the positive-going pulses, but it is not material to the operation of the write circuits.)

The circuit 74 responds to the clock pulse to initiate a square wave and the first positive-going pulse to complete it (d). The circuit 75 also starts a squarewave at the clock pulse but finishes it at the second positive-going pulse (e). These are the write waveforms, and will be read back again as the waveforms shown at a and b.

The timing controls are supplied either by the microprocessor (in the second form) or by separate logic elements (in the first form).

We claim:

1. A method of positioning a transducer assemblage relative to a rotatable magnetic disc having a plurality of data tracks disposed about the axis of rotation of the disc, said transducer assemblage having a movable magnetic read-write head and a position transducer fixed relative thereto, said position transducer being operative to indicate the position of the read-write head, and the rotatable magnetic disc having recorded thereon at least three non-colinear reference regions lying on a reference track extending around the axis of rotation of the disc, the method comprising the steps of positioning, under control of the position transducer, the read-write head to the expected position of the reference track; measuring the actual position of the reference regions relative to the read-write head; storing the results of the measuring step; accessing a selected data track on the disc having a uniform spatial relationship with said reference track by moving the head to a position indicated by the position transducer to correspond to the selected data track; and, during rotation of the disc, reading out the stored results and utilising said stored results to modify the position of the read-write head relative to the axis of rotation of the disc to maintain the head in alignment with said selected data track.

2. A method as claimed in claim 1 in which the measuring step comprises controlling the head to follow the reference track during rotation of the disc; utilising the head to read reference signals from the reference regions and then utilising the indications of the position transducer and the reference signals read by the head to generate the measurement representing the actual position of the reference regions.

3. A magnetic disc data storage device comprising an exchangeable magnetic disc mounted on rotary means for rotation about an axis of rotation; a read-write head; a head motor operable to move the head radially of the disc; a position transducer connected to said head and operative to generate a head position signal representing the position of the head relative to said axis of rotation; at least three non-collinear reference positions on said disc lying on a reference track extending around said axis of rotation; first means operable to move the position transducer to a reference position and to there generate measurement signals representing the positions of the reference positions relative to the position transducer; storage means operative to store the measurement signals; at least one data track on the disc extending in uniform spatial relationship relative to said reference track; addressing means operable to generate a data track address signal corresponding to a selected one of said data tracks on the disc; read out means operative to read out the measurement signals; and second means responsive to the data track address signal and to the measurement signals to generate a control signal to operate the head motor to maintain the head in alignment with said selected data track.

4. A data storage device as claimed in claim 3 in which the first means operates the head motor responsive to the position transducer to move the head to the expected position of the reference track and in response to the reference signals read by the head from the reference positions on said reference track to generate the measurement signals.

5. A data storage device as claimed in claim 3 in which the reference positions comprise a plurality of reference signals magnetically recorded in a continuous reference track; said first means including means operative in synchronism with the rotation of the disc to generate angular position signals corresponding to a sequence of angular positions of the disc during each revolution of the disc; sampling means, in response to each signal of the sequence of angular position signals, for generating measurement signal corresponding to each of the angular positions of the disc; and in which the read out means is rendered operative in response to each angular position signal.

* * * * *